US012768151B2

(12) United States Patent
Bledsoe et al.

(10) Patent No.: US 12,768,151 B2
(45) Date of Patent: Oct. 20, 2026

(54) WATER DETECTION, DISTRIBUTION AND MONITORING SYSTEM

(71) Applicant: Ocean Park Mechanical Inc, Seattle, WA (US)

(72) Inventors: Barry Bledsoe, Terrebonne, OR (US); Roger Hendrix, Blaine, WA (US)

( * ) Notice: Subject to any disclaimer, the term of this patent is extended or adjusted under 35 U.S.C. 154(b) by 28 days.

(21) Appl. No.: 19/098,519

(22) Filed: Apr. 2, 2025

(65) Prior Publication Data

US 2026/0308893 A1 Oct. 8, 2026

(51) Int. Cl.

| | |
|---|---|
| ***E03B 7/07*** | (2006.01) |
| ***F24H 9/16*** | (2022.01) |
| ***F24H 15/457*** | (2022.01) |
| ***G08B 21/20*** | (2006.01) |

(52) U.S. Cl.

CPC ............... *E03B 7/071* (2013.01); *F24H 9/16* (2013.01); *F24H 15/457* (2022.01); *G08B 21/20* (2013.01); *Y02A 20/15* (2018.01)

(58) Field of Classification Search

CPC ........... Y02A 20/15; E03B 7/071; E03B 5/02; G05B 15/02; G08B 21/20; G08B 21/18; G08B 25/14; F24H 9/16; F24H 15/457; F24H 15/12

See application file for complete search history.

(56) References Cited

U.S. PATENT DOCUMENTS 6,209,576 B1 * 4/2001 Davis .................. G05D 7/0635 137/460
6,237,618 B1 * 5/2001 Kushner ................ E03B 7/071 137/1
6,552,647 B1 * 4/2003 Thiessen ............... G05B 15/02 219/448.11
6,860,288 B2 * 3/2005 Uhler .................. G01M 3/2807 137/551
7,966,099 B2 * 6/2011 Fima ......................... E03B 1/00 239/128
8,844,835 B2 * 9/2014 Ford ...................... G08B 21/20 236/44 C
9,109,349 B1 * 8/2015 Minton, Jr. ............. E03B 7/071
9,383,289 B1 * 7/2016 Meyer .................... G08B 25/14
9,912,492 B2 * 3/2018 McCarthy, III ........ G05B 11/01
10,215,424 B2 * 2/2019 Acker ................ F24D 19/1063

(Continued)

FOREIGN PATENT DOCUMENTS

DE 102011055759 A1 * 5/2013 ............. E03B 7/071

*Primary Examiner* — David Colon-Morales

(74) *Attorney, Agent, or Firm* — The Rapacke Law Group, P.A.; Andrew S. Rapacke; Kenneth F. Brooks

(57) ABSTRACT

A water detection, monitoring, and distribution system is disclosed, including a pump skid comprising a frame and a housing. The frame supports a pump to distribute water from a water inlet to one or more water outlets, a variable frequency drive to control a flow rate of water through the pump, and sensors to monitor water pressure and water presence in an environment. The frame also supports a controller connected to a communication system to provide remote operation of the controller. A drain is operated by the controller to enable the drainage of water if a critical event is detected by the one or more sensors. An alarm system initiates an alarm if the critical event is detected. The alarm is transmitted by the communication system and wherein the alarm is received by a remote computing device.

20 Claims, 5 Drawing Sheets

(56) References Cited

U.S. PATENT DOCUMENTS

| | | | | |
|---|---|---|---|---|
| 10,352,504 | B2 * | 7/2019 | Dietzen | G01M 3/2807 |
| 10,352,814 | B2 * | 7/2019 | Enev | E03B 7/071 |
| 10,697,848 | B1 * | 6/2020 | Dobbs | E03B 7/04 |
| 11,047,496 | B1 * | 6/2021 | McConnell | E03B 7/071 |
| 11,118,997 | B2 * | 9/2021 | Bunker | G01M 3/26 |
| 11,493,371 | B2 * | 11/2022 | Patel | E03B 7/071 |
| 11,573,150 | B2 * | 2/2023 | Downey | G16Y 40/35 |
| 12,378,753 | B1 * | 8/2025 | Barba | E03B 5/06 |
| 12,590,711 | B2 * | 3/2026 | Thurlkill | F24D 19/1033 |
| 2015/0376874 | A1 * | 12/2015 | Breedlove | E03B 7/071 137/15.11 |
| 2016/0161940 | A1 * | 6/2016 | Max | F17D 5/00 700/282 |
| 2017/0285665 | A1 * | 10/2017 | Nunally | E03B 7/071 |

* cited by examiner

WATER DETECTION, DISTRIBUTION AND MONITORING SYSTEM

TECHNICAL FIELD

The embodiments disclosed herein generally to the remote access and control of water monitoring, detection, and distribution systems.

BACKGROUND

It is important for construction sites to have the ability to receive water during the construction process before permanent water service is installed. To accomplish this, water pumps are used to which distribute water to the construction site. These temporary water distribution systems must be monitored to ensure they are working properly in to prevent damage to the construction site if a system failure occurs.

Existing systems provide on/off pump control without ramping the pump that can cause water damage and/or piping failures. This requires an operator to recognize the potential for failure and to manually shut down the system at the water pump's location. These current systems do not provide remote web access, alarming, scheduling, water detection, pump protections, or customizability to the specific construction site. Further, the current systems do not provide emergency system drains to remove pressure and water from the piping to limit water damage.

SUMMARY OF THE INVENTION

This summary is provided to introduce a variety of concepts in a simplified form that is further disclosed in the detailed description of the embodiments. This summary is not intended for determining the scope of the claimed subject matter.

A water detection, monitoring, and distribution system is disclosed, including a pump skid comprising a frame and a housing. The frame supports a pump to distribute water from a water inlet to one or more water outlets, a variable frequency drive to control a flow rate of water through the pump, and sensors to monitor water pressure and water presence in an environment. The frame also supports a controller connected to a communication system to provide remote operation of the controller. A drain is operated by the controller to enable the drainage of water if a critical event is detected by the one or more sensors. An alarm system initiates an alarm if the critical event is detected. The alarm is transmitted by the communication system and wherein the alarm is received by a remote computing device.

The water detection system may be utilized during construction of a building or structure as a temporary means of detecting leaks, providing remote alarming, managing water distribution systems, and as an emergency response system. The system is designed to be deployed at a construction site prior to the site's connection to the municipal water source. The system is adaptable such that it can integrate with the water distribution system throughout the construction process, thus adapting to changes in monitoring systems, water delivery means, alarm systems, and emergency shut-off and control systems. The water detection system provides a means of detecting and mitigating the consequences of a critical event such as the rupture of a pipe.

A computing system is operable to execute a mitigation strategy if a critical event is detected. This process includes receiving an alarm signal and determining the location of the critical event. The computing system then determines a mitigation strategy which mitigates the effects of the critical event such as by opening and/or closing one or more valves or drains, modifying the operation of the pump, etc.

In some aspects, the communication system comprises a multi-antenna array to provide cellular and GPS connectivity.

In some aspects, the one or more sensors include at least one of the following: one or more pressure transducers and one or more moisture sensors.

In some aspects, the one or more pressure transducers monitor pressure at least one inlet and at least one outlet.

In some aspects, the one or more sensors are positioned to detect water at an electric water heater.

In some aspects, the one or more sensors are positioned to detect water at a condensing unit.

In some aspects, the one or more sensors are positioned to detect water at a boiler plant.

In some aspects, the communication system enables an operator to remotely monitor and control the operation of the pump using the remote computing device to initiate an emergency shut sequence to perform a shutdown of a domestic water system.

In some aspects, the system includes a connection for a building management system computer to connect to the controller, wherein the building management system computer is in communication with a permanent internet connection, and wherein connecting the building management system computer to the permanent internet connection disables the access of the remote computing device.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1A:
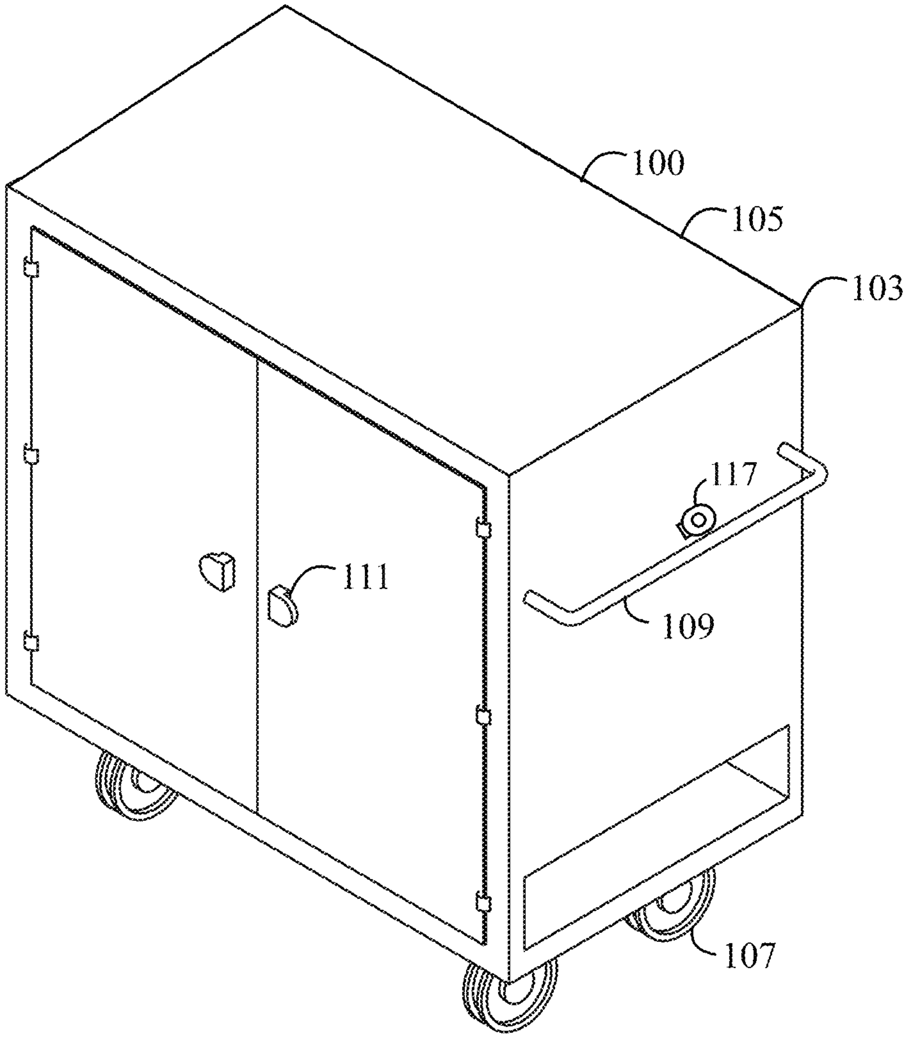
FIG. 1A illustrates a perspective view of the pump skid and water detection system, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing in detail exemplary embodiments, it is noted that the embodiments reside primarily in combinations of components related to particular devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to a remote water detection, monitoring, and distribution system used on construction sites before permanent water service is installed. The system is utilized as a temporary water distribution system at the construction site and is capable of being remotely accessed, controlled, and monitored to prevent or at least reduce the likelihood of a system failure. In such, the system provides a means of limiting potential water damage at the construction site if a system failure occurs.

The system includes a pump skid constructed of a frame and a housing. The frame provides support to the pump, variable frequency drive, sensors, and controller. A multi-antenna array mounts to the housing to provide cellular and Global Positioning System (GPS) connectivity to enable the remote operation of the system.

In some embodiments, the sensors include one or more pressure transducers to monitor outlet pressures. One or more water detection sensors monitor the system for leaks. In the event that a threshold pressure value is reached, or moisture is detected (identifying a leak), an alarm system receives an alert signal, and an alarm is triggered. The alarm system may then provide an output signal to the controller to enable the shutoff, adjustment, or other means of mitigating damage to the water system.

In some embodiments, the sensors may be capable of detecting moisture near electric water heaters. If water is detected near an electric water heater, a booster pump is disabled, the valve transmitting water the affected electric water heater is closed, and an alarm is initiated.

In some embodiments, the sensors may be capable of detecting moisture near condensing units. If water is detected near a condensing unit, the modulating valve is closed, and an alarm is initiated. A manual pump shutdown may also be provided as a part of the BMS computer.

In some embodiments, the sensors may be capable of detecting moisture near boiler plants. If water is detected near a boiler plant, the boilers are disabled, boiler pumps are disabled, and an alarm is initiated.

The system includes an emergency drain which is operable if a critical event occurs. The term "critical event" may be used to define an event which has the likelihood of causing water damage at the construction site. This may include a rupture or leaking water pipe, water backup, increase in water pressure, etc. The emergency drain may be in communication with a shutdown switch which performs a complete shutdown of the water system and instructs the system to drain the water pipes to decrease the likelihood of damage or failure of the water pipes.

In some embodiments, the system may be used with or without permanent power connection at the construction site. In such, the system is adaptable based on the resources available at the construction site. Prior to accessing the permanent power supply (i.e., prior to the system's connection to the power grid at the construction site) the system utilizes cellular or similar remote communication systems to enable the remote access to the controller which is in communication with the pump. The system may be powered by a 208/230-volt power supply or a similar power supply which may be adaptable in the event of temporary loss of power. As building progresses at the construction site, systems which transition from being temporary to permanent or are newly added during the build process will be added to the detection network and be available for alarming, local, and/or remote control.

Once permanent power is accessed, the system is transferrable to the local site Building Management System (BMS) computer and the cellular router may be replaced with a hardwire connection to a permanent (on-site) internet connection. The BMS computer may then be used to monitor and control the system to enable local control of the system, rather than remote control.

The system enables a remote or local emergency shutdown of water distribution to water supply, heating, and other water control systems to minimize the effects of a critical event. As used herein, the term "critical event" is any event which can cause damage to the water distribution system, construction site, individuals, and the like such as, for example a pipe bursting, water leak, or other event which may cause water damage.

Figure 1B:
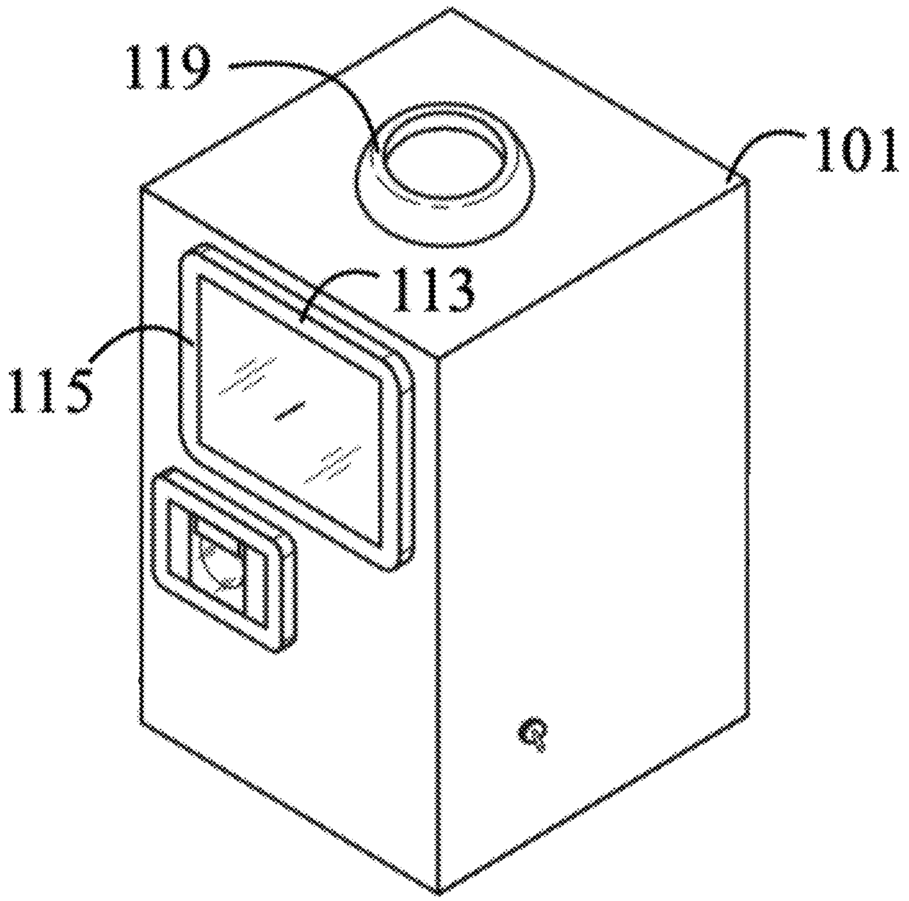
FIG. 1B illustrates a perspective view of the water detection, monitoring and distribution system positioned within the pump skid, according to some embodiments.

FIG. 1A and FIG. 1B illustrates the pump skid 100 which contains the components of the water detection, monitoring and distribution system 101 (which may be referred to hereinafter as "system" or "the system". The pump skid 100 includes a frame 103 which supports a pump to distribute water from a water inlet to one or more water outlets. The pump skid 100 is constructed of a housing 105 to enclose the electrical and mechanical components of the system 101. The pump skid 100 is designed to be portable and may include wheels 107, a handle 109, doors 111, and sidewalls to protect the components therein. The pump skid 100 may be readily deployed, moved, relocated, and otherwise positioned at a construction site to control the water pump and distribution of water to the construction site. A controller 113 is positioned on the pump skid 100 to enable an operator to interact with a user interface 115, emergency shut down switch 117, and other controls for the system.

The controller 113 provides a user interface 115 which enables the operator to view the status of the system 101, control various valves such as by opening and/or closing valves, open and/or close the inlet to receive or stop the flow of water, open and/or close the outlet to expel or stop the outflow of water, as well as otherwise control the various peripheral devices of the system 100.

The pump skid 100 may include a multi-antenna array 119 positioned on or within the housing 105. The multi-antenna array 119 enables the communication between the controller 113 and a remote computing device or other computing device used to operate the system 101.

Figure 2:
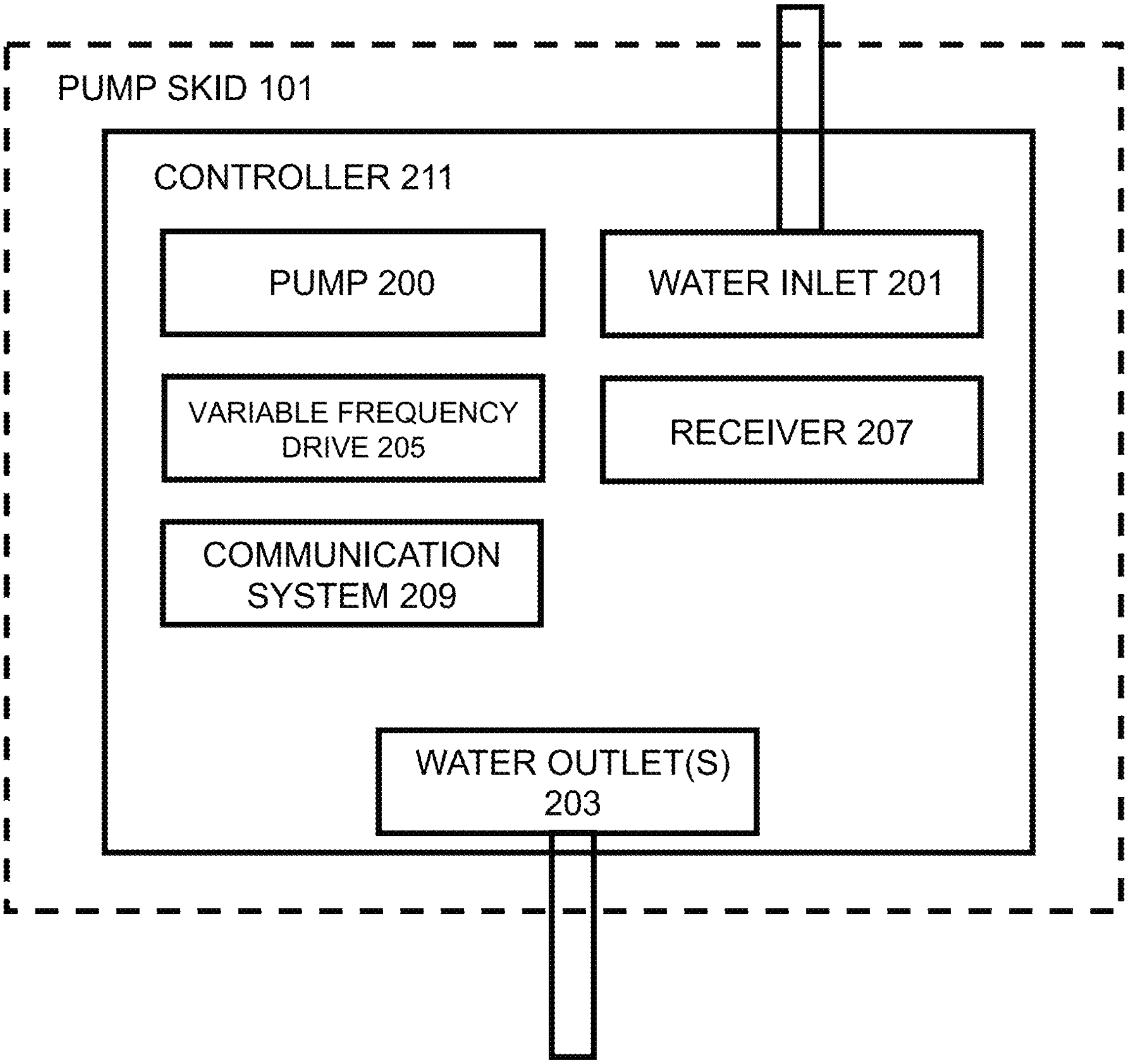
FIG. 2 illustrates a block diagram of the water detection system, according to some embodiments.

FIG. 2 illustrates a block diagram of the components within the pump skid 100 including a pump 200, water inlet 201, water outlet(s) 203, variable frequency drive 205, receiver 207, communication system 209, and controller 211. The pump 200 is in operable communication with the variable frequency drive 205 to control the flow of water through the pump 200 such that the operator can increase, decrease or stop the flow of water via the controller 211. In such, the pump 200 intakes water through one or more water inlets 201 which may be the municipal water source or other water source (either temporary or permanent). Water outlets 203 are positioned on the downstream end of the pump 200 and may also be used to define water outlets 203 in the environment wherein the system is operating. A receiver 207 receives signals from a remote computing device or the controller 211 and relays signals to the communication system 209. The communication system 209 is operable to communicate with the remote computing device, controller 211, external and/or auxiliary systems, valves, etc.

Figure 3:
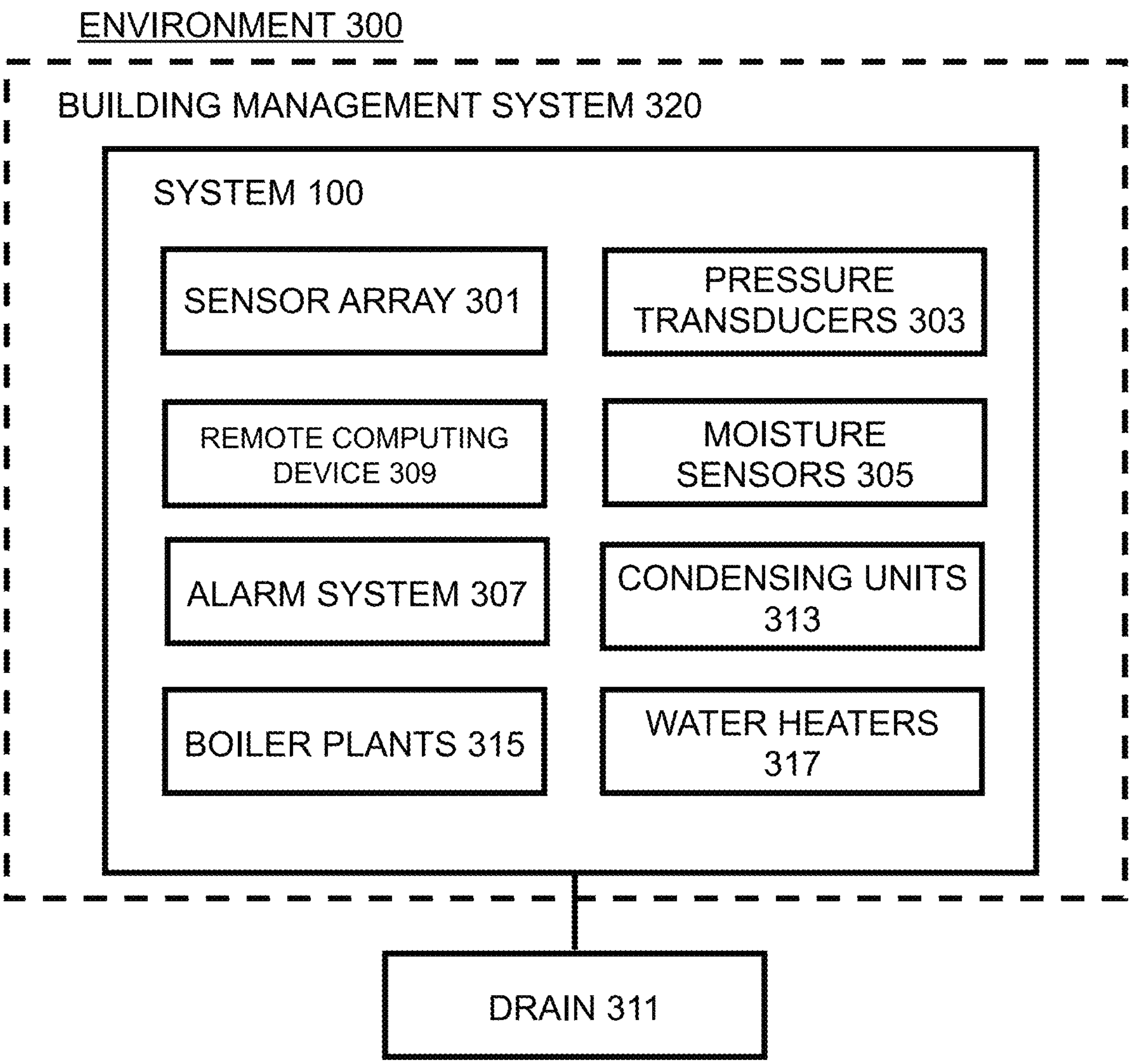
FIG. 3 illustrates a block diagram of the building management and water detection systems, according to some embodiments.

FIG. 3 illustrates a schematic of an environment 300 wherein the system 100 operates. For example, the environment 300 may be construction site, building, or other area in which the temporary monitoring and distribution of water is controlled by an operator and the system. A sensor array 301 comprises a plurality of sensors such as, but not limited to one or more pressure transducers 303, one or more moisture sensors 305 and other types of sensors used to monitor and detect the presence of water in an environment. An alarm system 307 is positioned within the environment and is in communication with the communication system to initiate an alarm sequence if a critical event is detected. The alarm system 307 in in communication with a remote computing device 309 which may include a smartphone, computer, tablet, or other computing device known in the arts. This alarm system 307 may also be in communication with alarms within the environment which emit an alert in the event of a critical event.

In some embodiments, the initiation of an alarm sequence may instruct the system to close or open a drain 311 within the environment. For example, opening the drain may release pressure within the conduit of the water distribution system in an attempt to avoid the conduit from bursting, causing the environment to flood or become damaged by the excessive presence of water. Closing the drain may restrict the flow of water therefrom in the event where water exiting the drain would cause the environment to flood or otherwise become damaged by the presence of water.

In some embodiments, one or more sensors comprising the sensor array 301 may be positioned to detect the presence of water within, on, or near condensing units 313, boiler plants 315, water heaters 317, or other auxiliary water modification and distribution systems. In such, the system 100 operates as a building management system 320 which monitors, detects, and/or controls water thereto and therefrom.

Figure 4:
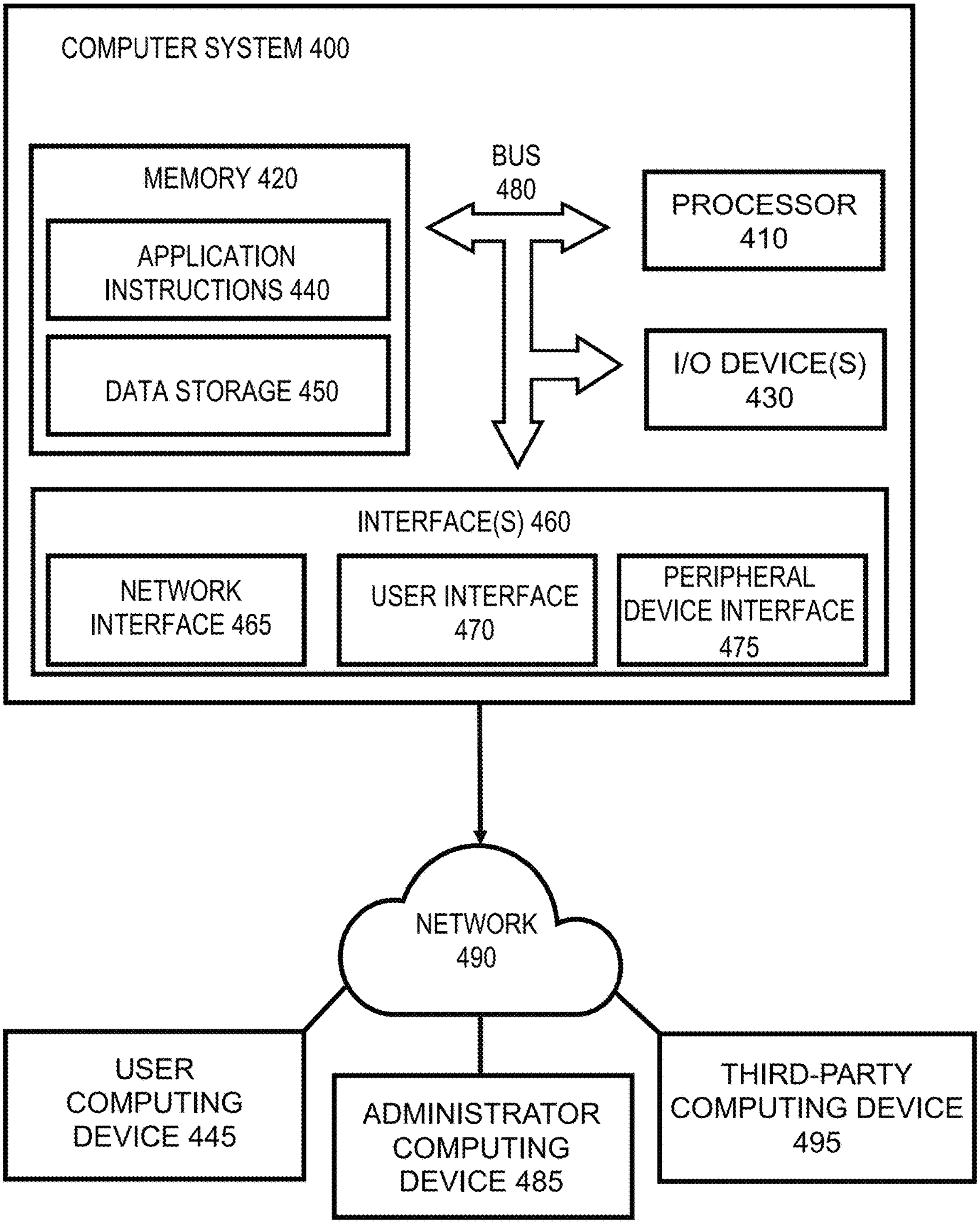
FIG. 4 illustrates a computing system infrastructure utilized to enable an operator to use an application program to monitor and control the water detection system, according to some embodiments.

FIG. 4 illustrates a block diagram of an exemplary computing system 400 which is accessible by an operator to monitor and control the water detection system. The computer system 400 that may be utilized to execute various procedures, including the processes described herein. The computer system 400 comprises a standalone computer or mobile computing device, a mainframe computer system, a workstation, a network computer, a desktop computer, a laptop, or the like. The computing device 400 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 400 includes one or more processors 410 coupled to a memory 420 through a system bus 480 that couples various system components, such as an input/output (I/O) devices 430, to the processors 410. The bus 480 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 400 includes one or more input/output (I/O) devices 430, such as video device(s) (e.g., a camera), audio device(s), and display(s) are in operable communication with the computer system 400. In some embodiments, similar IO devices 430 may be separate from the computer system 400 and may interact with one or more nodes of the computer system 400 through a wired or wireless connection, such as over a network interface.

Processors 410 suitable for the execution of computer readable program instructions include both general and special purpose microprocessors and any one or more processors of any digital computing device. For example, each processor 410 may be a single processing unit or a number of processing units and may include single or multiple computing units or multiple processing cores. The processor(s) 410 can be implemented as one or more microprocessors, microcomputers, microcontrollers, digital signal processors, central processing units, state machines, logic circuitries, and/or any devices that manipulate signals based on operational instructions. For example, the processor(s) 410 may be one or more hardware processors and/or logic circuits of any suitable type specifically programmed or configured to execute the algorithms and processes described herein. The processor(s) 410 can be configured to fetch and execute computer readable program instructions stored in the computer-readable media, which can program the processor(s) 410 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 420 includes computer-readable application instructions 450, configured to implement certain embodiments described herein, and a database 450, comprising various data accessible by the application instructions 440. In some embodiments, the application instructions 440 include software elements corresponding to one or more of the various embodiments described herein. For example, application instructions 440 may be implemented in various embodiments using any desired programming language, scripting language, or combination of programming and/or scripting languages (e.g., Android, C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 440 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 410 such that the processor 410 can read information from, and write information to, the storage medium. In the alternative, the storage medium may be integrated into the processor 410. Further, in some embodiments, the processor 410 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 440 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 440 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 440 can be downloaded to a computing/processing device from a computer readable storage medium, or to an external computer or external storage device via a network 490. A network adapter card or network interface in each computing/processing device receives computer readable program instructions from the network and forwards the computer readable application instructions 140 for storage in a computer readable storage medium within the respective computing/processing device.

In some embodiments, the computer system 400 includes one or more interfaces 460 that allow the computer system 400 to interact with other systems, devices, or computing environments. In some embodiments, the computer system 400 comprises a network interface 465 to communicate with a network 490. In some embodiments, the network interface 465 is configured to allow data to be exchanged between the computer system 400 and other devices attached to the network 490, such as other computer systems, or between nodes of the computer system 400. In various embodiments, the network interface 465 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 470 and the peripheral device interface 475.

In some embodiments, the network 490 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 490 can comprise copper transmission cables, optical transmission fibers, wireless transmission, routers, firewalls, switches, gateway computers and/or edge servers. The network 490 can represent a single network or multiple networks. In some embodiments, the network 490 used by the various devices of the computer system 400 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 400 may include a user computing device 145, an administrator computing device 485 and a third-party computing device 495 each in communication via the network 490. The administrator computing device 485 is utilized by an administrative user to moderate content and to perform other administrative functions. The third-party computing device 495 may be utilized by third parties to receive communications from the user computing device, transmit communications to the user via the network, and otherwise interact with the various functionalities of the system.

For example, the operator may utilize the computer system 400 as described above to receive an alarm signal and act accordingly, control various aspects of the system (i.e., valves, pump operating condition, etc., as well as to modify the system as the building project progresses.

The computer system 400 may autonomously or semi-autonomously initiate the emergency shut off of various aspects of the system if a critical event occurs. These processes may be performed with or without operator consent such that operator input may not be needed to perform specific tasks. For example, the computer system 400 may execute a mitigation strategy such as by analyzing one or more alerts received from the alarm system to determine a location of a critical event. The computer system 400 may then determine a mitigation strategy to reduce damage caused by the critical event. This mitigation strategy may be, for example, opening or closing one or more valves, stopping or otherwise modifying the operation of the pump, opening and/or closing a drain, etc.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety to the extent allowed by applicable law and regulations. The systems and methods described herein may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is provided for purposes of illustrating, explaining, and describing embodiments of this disclosure. Modifications and adaptations to these embodiments will be apparent to those skilled in the art and may be made without departing from the scope or spirit of this disclosure.

As used herein and in the appended claims, the singular forms "a", "an", and "the" include plural referents unless the context clearly dictates otherwise.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic intervening entities) and the indirect coupling of two entities (with one or more non-negligible intervening entities). Where entities are shown as being directly coupled together or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described herein. A variety of modifications and variations are possible in light of the above teachings without departing from the following claims.

What is claimed is:

1. A water detection, monitoring, and distribution system, comprising:
- a pump skid comprising a frame and a housing, the frame to support:
  - a pump to distribute water from a water inlet to one or more water outlets;
  - a variable frequency drive to control a flow rate of water through the pump;
  - one or more sensors to monitor water pressure and water presence in an environment;
  - a controller connected to a communication system to provide remote operation of the controller;
- a drain operated by the controller or a user to enable the drainage of water if a critical event is detected by the one or more sensors and is authorized by the user;
- an alarm system to initiate an alarm if the critical event is detected,
- wherein the alarm is transmitted by the communication system and wherein the alarm is received by a remote computing device.

2. The system of claim 1, wherein the communication system comprises a multi-antenna array to provide cellular and GPS connectivity.

3. The system of claim 1, wherein the one or more sensors include at least one of the following: one or more pressure transducers and one or more moisture sensors.

4. The system of claim 3, wherein the one or more pressure transducers monitor pressure at least one inlet and at least one outlet.

5. The system of claim 4, wherein the one or more sensors are positioned to detect water at an electric water heater.

6. The system of claim 5, wherein the one or more sensors are positioned to detect water at a condensing unit.

7. The system of claim 6, wherein the one or more sensors are positioned to detect water at a boiler plant.

8. The system of claim 1, wherein the communication system enables an operator to remotely monitor and control the operation of the pump using the remote computing device to initiate an emergency shut sequence to perform a shutdown of a domestic water system.

9. The system of claim 1, further comprising a connection for a building management system computer to connect to the controller, wherein the building management system computer is in communication with a permanent internet connection, and wherein connecting the building management system computer to the permanent internet connection disables the access of the remote computing device.

10. A water detection, monitoring, and distribution system, comprising:
- a pump skid comprising a frame and a housing, the frame to support:
  - a pump to distribute water from a water inlet to one or more water outlets;
  - a variable frequency drive to control a flow rate of water through the pump;
  - one or more sensors to monitor water pressure and water presence in an environment;
  - a controller connected to a communication system to provide remote operation of the controller;
- a drain operated by the controller or a user to enable the drainage of water if a critical event is detected by the one or more sensors and is authorized by the user;
- an alarm system to initiate an alarm if the critical event is detected, wherein the alarm is transmitted by the communication system and wherein the alarm is received by a remote computing device operating a processor to perform the following steps:

analyzing one or more alerts received from the alarm system to determine a location of the critical event; and determining a mitigation strategy to reduce damage caused by the critical event.

11. The system of claim 10, wherein the mitigation strategy includes at least one of the following:

opening the drain; and closing one or more valves.

12. The system of claim 10, wherein the communication system comprises a multi-antenna array to provide cellular and GPS connectivity.

13. The system of claim 10, wherein the one or more sensors include at least one of the following: one or more pressure transducers and one or more moisture sensors.

14. The system of claim 13, wherein the one or more pressure transducers monitor pressure at least one inlet and at least one outlet to enable the operation of one or more valves.

15. The system of claim 14, wherein the one or more sensors are positioned to detect water at an electric water heater.

16. The system of claim 15, wherein the one or more sensors are positioned to detect water at a condensing unit.

17. The system of claim 16, wherein the one or more sensors are positioned to detect water at a boiler plant.

18. The system of claim 17, wherein the communication system enables an operator to remotely monitor and control the operation of the pump using the remote computing device to initiate an emergency shut sequence to perform a shutdown of a domestic water system.

19. The system of claim 18, wherein the remote computing device is in operable communication with an application program to enable the remote control and monitoring of the water distribution system via a user interface provided on a display of the remote computing device, the application program comprising:

a display module to display one or more system controls and to enable the selection of a mitigation strategy via the user;

an alert module to transmit an alert to one or more input/output devices of the remote computing device;

a control module to display a status associated with one or more water distribution system components in real-time, wherein the control module enables the transmission, via a communication module, of one or more operating instructions to enable to instruct the controller to initiate the mitigation strategy.

20. A remotely-accessible water detection, monitoring, and distribution system, comprising:

a remote computing device in wireless communication with a controller positioned on a pump skid, the remote computing device operating an application program to enable the remote control of a water distribution system, the water distribution system comprising:

a pump including a variable frequency drive to control a flow rate of water to one or more water distribution system components;

a sensor array positioned to sense pressure and presence of water at the one or more water distribution system components;

a drain operated by the controller to enable the drainage of water if a critical event is detected by the sensor array;

an alarm system to initiate an alarm if the critical event is detected;

the application program;

a processor to operate computer-readable instructions received from the application program, the application program comprising:

a display module to display one or more system controls and to enable the selection of a mitigation strategy via a user;

an alert module to transmit an alert to one or more input/output devices of the remote computing device;

a control module to display a status associated with the one or more water distribution system components in real-time, wherein the control module enables the transmission, via a communication module, of one or more operating instructions to modify the pump operation or to instruct the controller to initiate the mitigation strategy.

* * * * *